Feb. 13, 1968  A. W. GAUBATZ  3,368,794
REENTRY TURBINE

Filed Aug. 3, 1966  3 Sheets-Sheet 1

INVENTOR.
Arthur W. Gaubatz
BY
Paul Fitzpatrick
ATTORNEY

INVENTOR.
Arthur W. Gaubatz
BY
Paul Fitzpatrick
ATTORNEY

Feb. 13, 1968  A. W. GAUBATZ  3,368,794
REENTRY TURBINE

Filed Aug. 3, 1966  3 Sheets-Sheet 3

INVENTOR.
Arthur W. Gaubatz
BY
Paul Fitzpatrick
ATTORNEY

3,368,794
REENTRY TURBINE
Arthur W. Gaubatz, Indianapolis, Ind., assignor to General Motors Corporation, Detroit, Mich., a corporation of Delaware
Filed Aug. 3, 1966, Ser. No. 569,897
2 Claims. (Cl. 253—66)

ABSTRACT OF THE DISCLOSURE

A reverse reentry multipass turbine with axial gap seals at the blade roots and tips, the stationary parts of these seals being mounted in the turbine case so as to retain the nozzle segments and sealing segments between the successive passes, which cooperate with the turbine blades to inhibit circumferential leakage.

---

My invention relates to turbines and is particularly directed to improvements in multipass gas turbines of the axial-flow type. In such a turbine the gaseous motive fluid makes a number of passes through a single rotor wheel, giving up energy at each pass. A turbine of this sort is particularly suitable in certain cases as, for example, where the spouting velocity is high and the flow is small. The multipass design makes possible a turbine having reasonably low rotational speed and reasonably large blade height in such situations, as contrasted with a multistage axial-flow turbine having full admission. It is also lighter, more compact, and more efficient than a multistage partial admission turbine.

The preferred embodiment of my invention described herein arises from the problem of providing a turbine intended to provide a large power output at a rotational speed suitable for driving a compressor or the like, which is energized by gas which has a low molecular weight, and in which the turbine has both a high inlet temperature and a high expansion ratio. In the particular installation, the mass flow through the turbine is small and the required flow area in the first stage nozzle is therefore small. By the provision of an advanced multipass single stage turbine, reasonable efficiency with a simple structure and with suitably low peripheral and angular velocities is achieved.

In the illustrated embodiment of the invention, the turbine is a ten pass reverse reentry pressure compounded impulse turbine having improved structure and ducting features and improved provisions for sealing. The sealing is quite important where gas at widely different levels of pressure is fed in successive passes through the same turbine wheel.

The principal object of the invention is to provide a relatively efficient low speed turbine adapted for operation at high pressure ratios and low mass flows, particularly when the motive fluid is one of low molecular weight.

Another object of the invention is to provide improved sealing for a turbine and particularly for a multipass turbine, including both improved circumferential sealing between the passes and improved sealing at the blade tip and wheel rim.

The nature of my invention and its advantages will be clear to those skilled in the art from the succeeding detailed description of the preferred embodiment and the accompanying drawings thereof.

Figure 1:
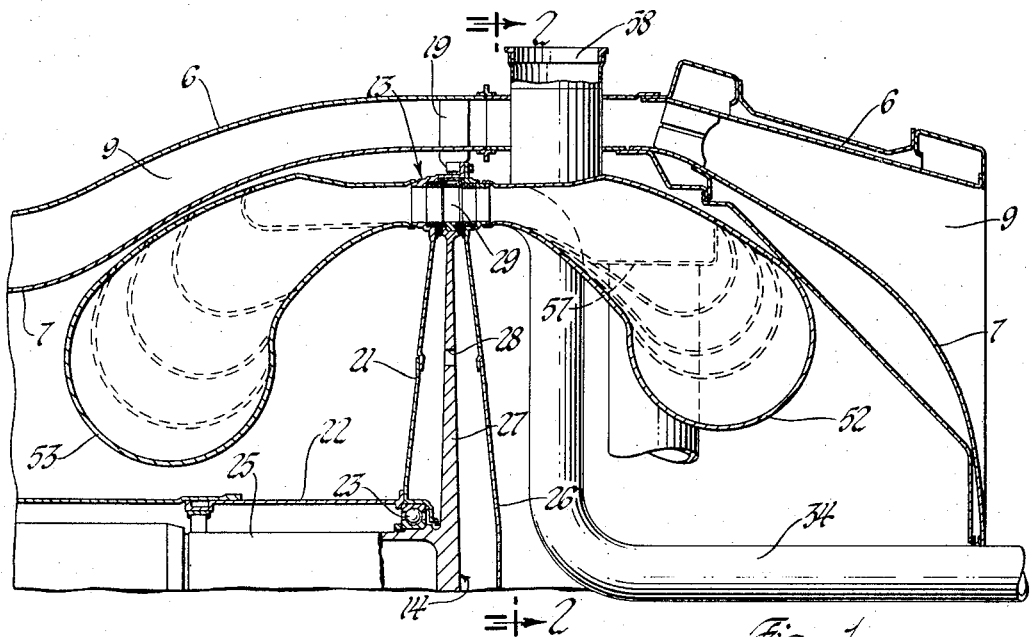
FIGURE 1 is a sectional view of a turbine as incorporated in a jet propulsion device, the section being taken on a plane containing the axis of the turbine.

Referring first to FIGURE 1, the turbine as illustrated forms a part of an engine the details of which are immaterial to the present invention. So far as it is illustrated, the engine comprises an outer wall 6 and an inner wall 7 defining between them an air passage 9. These walls are in two parts which are joined at a circumferential split line. The turbine of the invention comprises a case 13 and a wheel 14. The case has a forward section 15 and a rear section 17 having bolting flanges (FIGURE 4) by which they are bolted together and are fixed to bosses 18 at the inner ends of a number of tangential struts 19 extending from the outer wall 6 through the inner wall 7. The forward section 15 of the case is integral with an annular disk 21 which supports a shaft housing 22 and a turbine bearing 23 adjacent the turbine wheel 14. The turbine wheel comprises a disk 27 integral with the rear portion of shaft 25 which may drive a compressor to force air through the passage 9. A disk 26 integral with the rear case section 17 encloses the rear face of the turbine wheel 14. One or more holes 28 prevent pressure bias on the turbine disk. The turbine wheel 14 comprises disk 27 and a ring of blades 29 extending radially from the rim 31 of the disk. The blades may be mounted on the rim in any suitable manner as by dovetail roots 33 in a circumferential slot the rim suitably fixed against circumferential movement. Hot high pressure gas enters the turbine from a suitable heater (not shown) through a conduit 34 coaxial with shaft 22 and extending radially outward to an inlet housing 35. (See also FIGURE 3.)

Before describing details of the turbine, it may be noted that the gas flows from housing 35 into an inlet 37 defined by a flanged opening in the rear case section 17, through a cascade of first stage nozzle vanes 38 aligned with the first stage inlet, through the impulse blading 29 on the turbine wheel, and through an outlet 39 defined by a flanged opening in the forward case section 15. Recurved conduit 41 leads the gas from this outlet to the second inlet 42 which is in the forward case section, spaced circumferentially in the direction of rotation of the turbine from the first inlet and outlet. Here the gas is further expanded through the second stage nozzle defined by a cascade of vanes 43, again flows through the rotor blades, and flows through the second outlet 45 into a second conduit 46. This alternate forward and rearward movement of the gas with the expansion through nozzles at each stage continues in the illustrated pressure-compounded embodiment through ten passes in the turbine. It should be understood that stages may be velocity-compounded, if desired.

Figure 2:
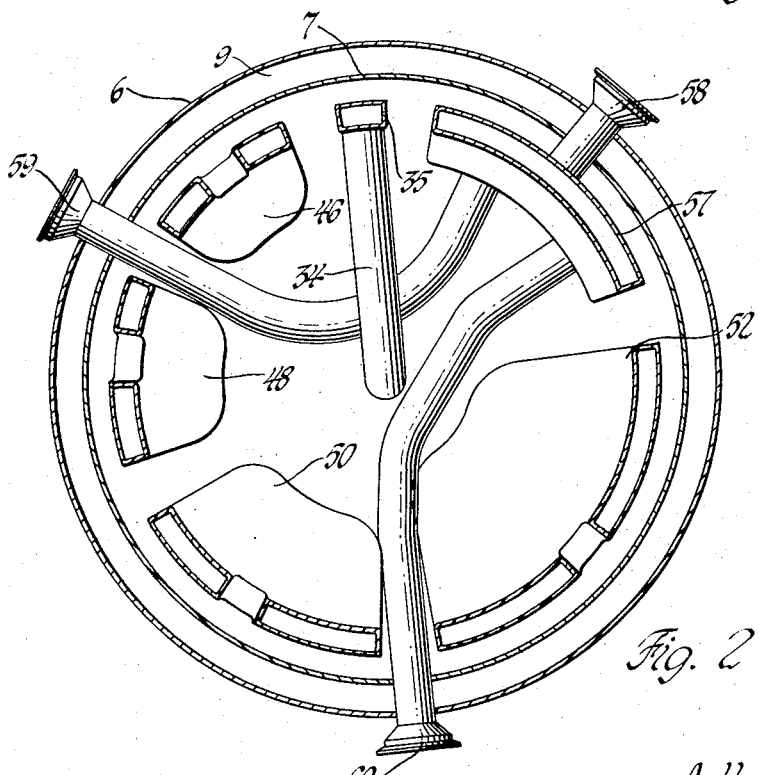
FIGURE 2 is a transverse sectional view of the engine taken on the plane indicated by the line 2—2 in FIGURE 1, to a smaller scale.

Referring to FIGURE 2, the gas flow through a conduit 48 after the fourth pass through the turbine, a conduit 50 after the sixth pass, and a conduit 52 after the eighth pass. It will be noted that the circumferential dimension of the successive passes increases as the gas is expanded and the density becomes less, and that the recurved conduits also become larger as the expansion proceeds. This is also indicated somewhat schematically in FIGURE 1 by the dotted outlines of successive ones of the conduits forward and rearward of the wheel. After proceeding through the ninth pass, the gas flows through the final recurved conduit 53, the last stage nozzle 55, and the turbine blading into an exhaust collector 57. From this the gas is fed to three outlets 58, 59, and 60 distributed circumferentially around the outer wall 6. The conduits leading from the exhaust collector 57 to the latter two outlets are fitted between adjacent recurved conduits.

Figure 3:
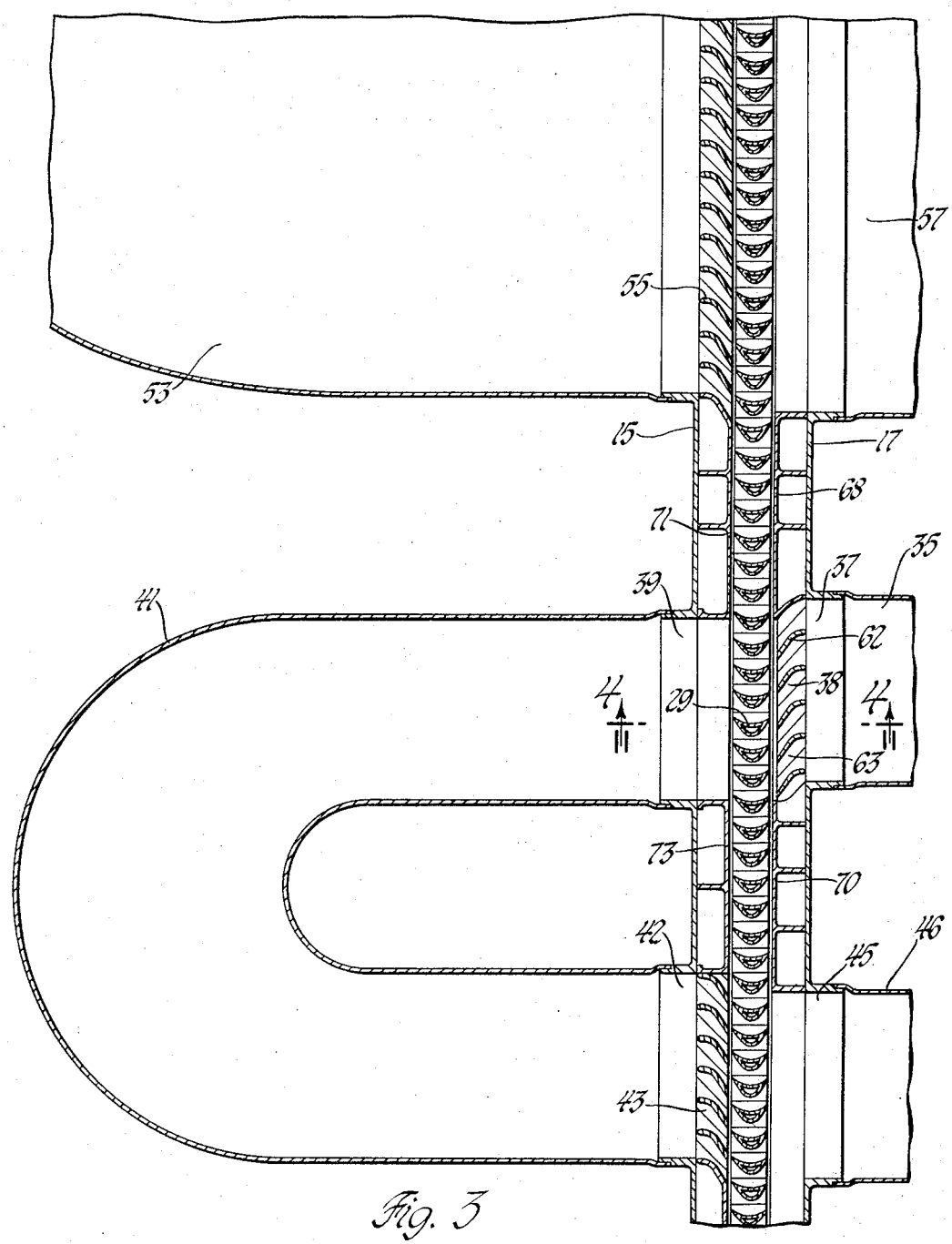
FIGURE 3 is a partial developed view of the turbine taken on a plane passing through the turbine nozzles and turbine rotor blades, to a larger scale than FIGURE 1.
Figure 4:
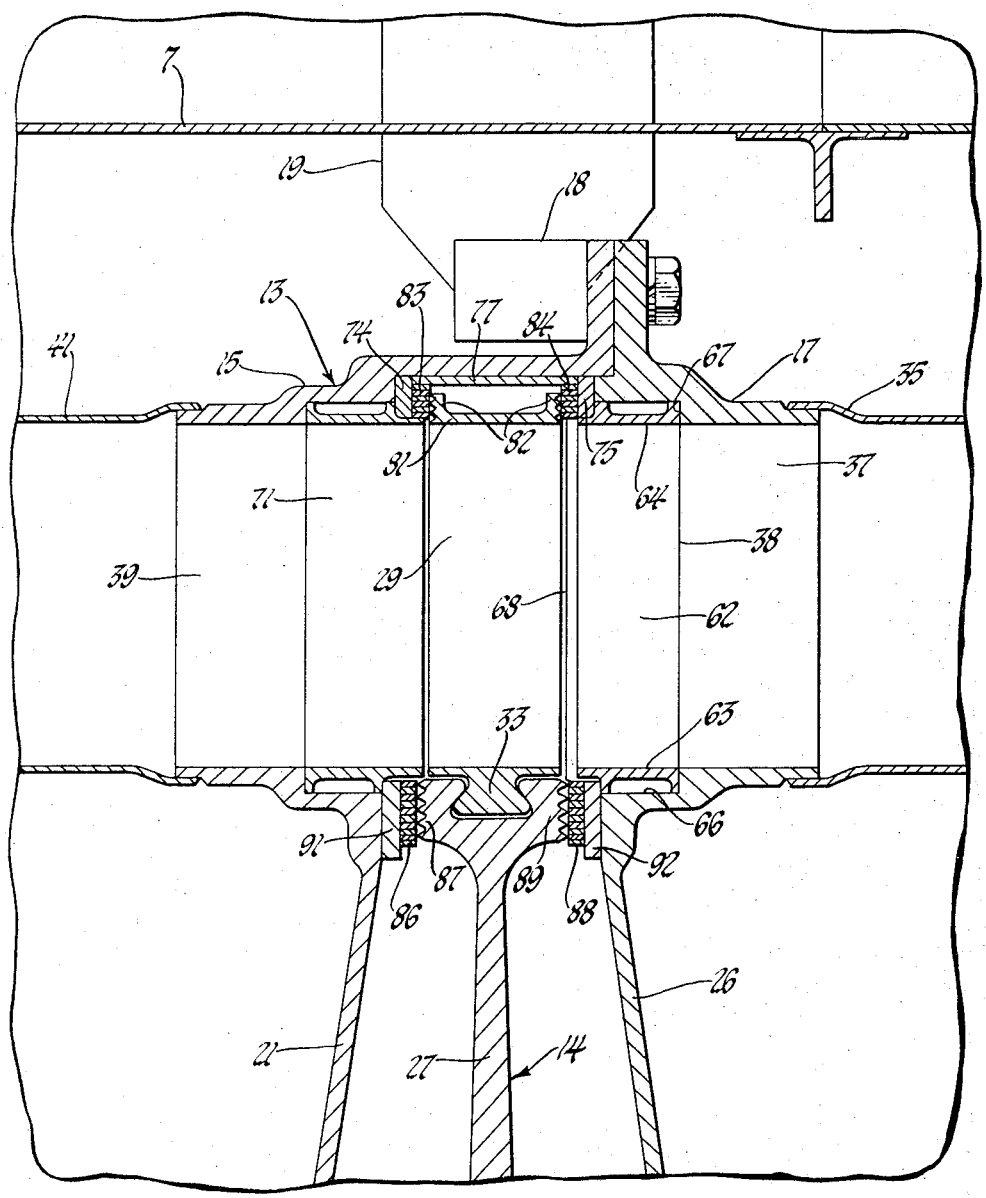
FIGURE 4 is a greatly enlarged partial sectional view similar to FIGURE 1.

Referring now to FIGURE 4, this showing is typical of the flow paths in which the gas flows forwardly and may be assumed to be the first turbine stage through inlet 35. The first stage nozzle 38 comprises a cascade of radial vanes 62 having inner platforms or shroud segments 63 and outer shroud segments 64 integral with the vanes. The segments are of rhomboidal form, as illustrated in FIGURE 3. The inner shroud segments 63 are mounted in a circumferential recess 66 in the inner wall of the rear case section 17. The outer shroud sections 64 bear against an abutment 67 in the outer wall of this case section. The vanes are thus located radially and axially of the turbine. They are fixed circumferentially by the fact that they are mounted between circumferential flow sealing plates or segments 68 and 70, these being disposed between the last stage outlet and first stage inlet and between the first stage inlet and second stage outlet, respectively. The sealing segments 68 and 70 may be mounted in the recess 66 and against the shoulder 67 and may be fixed circumferentially by any suitable means of attachment (not shown). It will be noted that the flat face of sealing plate 68 is disposed so as to extend very close to the rear edge of the blades 29. These seals are provided to minimize flow through the turbine from inlet 35 to outlet 46 or 57, bypassing the turbine blades.

Essentially the same condition exists at each interstage point, the only significant difference being that there are relatively small pressure drops in one direction from each of the first to the tenth passes in one direction and a large pressure drop in the opposite direction from the first to the tenth pass. FIGURES 3 and 4 also illustrate the circumferential seal plate 71 on the forward face of the wheel which is similar in structure to seals 68 and 70, and FIGURE 3 shows an additional seal segment 73 at the forward end of the wheel.

The outer edges of the circumferential seal segments and the nozzle vanes are retained in the case by a forward retainer ring 74 and a rear retainer ring 75 which engage shoulders on the forward and rear case sections, on the outer shrouds of the nozzle vanes, and on the seal segments. The retainer rings may be segmented. These in turn are located by a spreader ring 77 extending around the inside of the forward section 15 and bearing against the opposed faces of the rings 74 and 75. The ring 77 may be retained by studs passing through the case or other suitable means (not shown). To minimize leakage, the seal segments should be long enough circumferentially to cooperate with several rotor blades, preferably about two to twelve blades depending upon the pressure drop and other considerations.

The turbine also includes a blade tip seal defined in part by a rotor blade tip shroud 81 which may be composed of segments integral with or attached to the tips of blades 29. This shroud is of channel section and has flanges 82 which bear circumferential ridges on their outer faces to define one part of a labyrinth seal. These ridged faces cooperate with annular seal strips 83 and 84 mounted on the faces of retainers 74 and 75, respectively. These seal strips are preferably of an abradable honeycomb or cellular material and may be of material of the type described in United States patent application Ser. No. 526,207 of George B. Meginnis and Nick F. Bratkovich, filed Feb. 9, 1966. It is desirable to maintain a minimum clearance between cooperating parts of the labyrinth seal and the cellular material will permit wear of the strips 83 or 84 by the blade shroud in the event of interference. The principal purpose of the blade tip seals is not to prevent flow over the tips of the blades, which is not a problem in an impulse turbine, but to prevent flow circumferentially of the turbine through the space outward of the blade tips between passes at different pressures. Incidentally, because of differential expansion and creep, it is necessary to provide a substantial clearance between the blade shroud 81 and the spreader ring 77. With the radial type of labyrinth seal, relative radial growth of the rotating and stationary parts of the turbine is accommodated.

The turbine also includes seals at the forward and rearward faces of the wheel rim to prevent leakage from the motive fluid path into the space between the stator disks 21 and 26. These seals are similar in principle to those at the blade tip. A cellular ring 86 on the disk 21 cooperates with labyrinth seal ridges 87 on the forward face of the wheel rim 31. Similarly, the cellular seal ring 88 cooperates with labyrinth seal ridges 89 on the rear face of the rim. As with the blade tip seals, the minimum clearance is retained but there is tolerance for relative radial growth or expansion of the rotating parts. Seals 86 and 88 are mounted on annular or segmented rings 91 and 92, respectively, which are bolted or otherwise fixed to the turbine case disks 21 and 26. These retain the nozzle vanes and seal segments at the inner edge of the gas path. The seal strips 83, 84, 86, and 88 may be brazed or otherwise fixed to the rings on which they are mounted.

The operation of the turbine should be obvious from the foregoing to those skilled in the art and, therefore, will not be summarized. The description of the preferred embodiment of the invention for the purpose of explaining the principles thereof is not to be considered as limiting or restricting the invention, since many modifications may be made by the exercise of skill in the art.

I claim:
1. A multipass reverse reentry turbine comprising, in combination:
   a generally annular case having a forward and a rear section,
   the case defining a plural number of circumferentially spaced axial passes through the case, forward and rearward passes alternating circumferentially of the case,
   each pass comprising an inlet in one section and an outlet in the other section,
   the passes increasing in circumferential extent from high to low pressure,
   a turbine wheel coaxial with the case comprising a disk and a ring of blades extending radially from the disk rotatable successively through the passes,
   a blade tip shroud ring on the blades,
   a set of nozzle vanes in each inlet,
   a recurved conduit connecting each outlet with the succeeding inlet,
   sealing means opposing flow between the passes bypassing the blades and nozzles,
   each case section defining an annular recess and having a shoulder within the recess facing the wheel,
   the sets of nozzle vanes and sealing means being mounted in the recesses, and engaging the shoulders,
   means defining second shoulders on each case section adjacent to the recess and adjacent to the blade tip shroud and turbine wheel disk, and
   seal rings mounted in each case section cooperating with the blade tip shroud and the turbine wheel disk respectively,
   the seal rings bearing against said second shoulders and against the sets of nozzle vanes and the sealing means to retain the sets of nozzle vanes and the sealing means in the recesses.

2. A turbine as recited in claim 1 including also a spreader ring mounted in the case bearing against and retaining the seal rings which cooperate with the blade tip shrouds.

References Cited

UNITED STATES PATENTS

| | | | |
|---|---|---|---|
| 898,127 | 9/1908 | Moore | 253—66 |
| 969,821 | 9/1910 | Westinghouse | 253—66 |
| 1,031,757 | 7/1912 | Westinghouse | 253—66 |
| 3,164,369 | 1/1965 | Stewart et al. | 253—66 |

EVERETTE A. POWELL, JR., *Primary Examiner*